W. Brown,
Washing Machine.
Nº 35,296. Patented May 20, 1862.
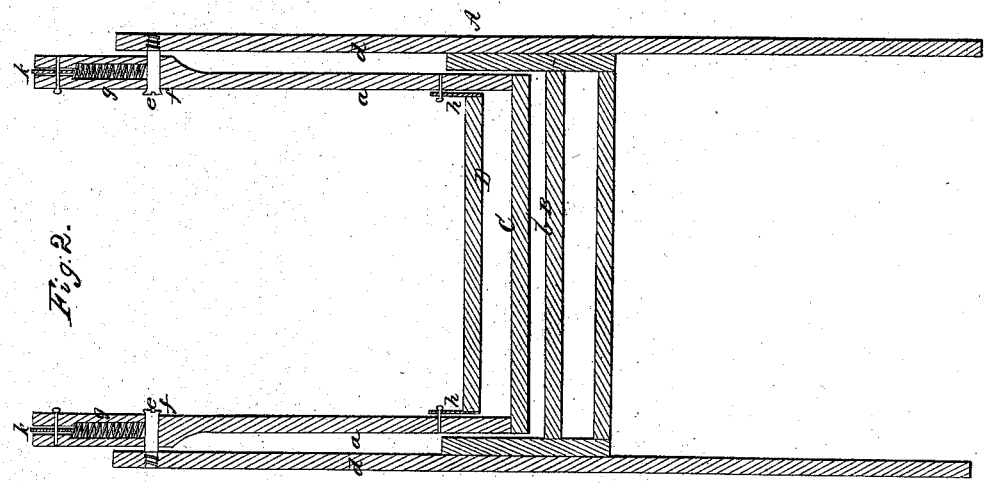
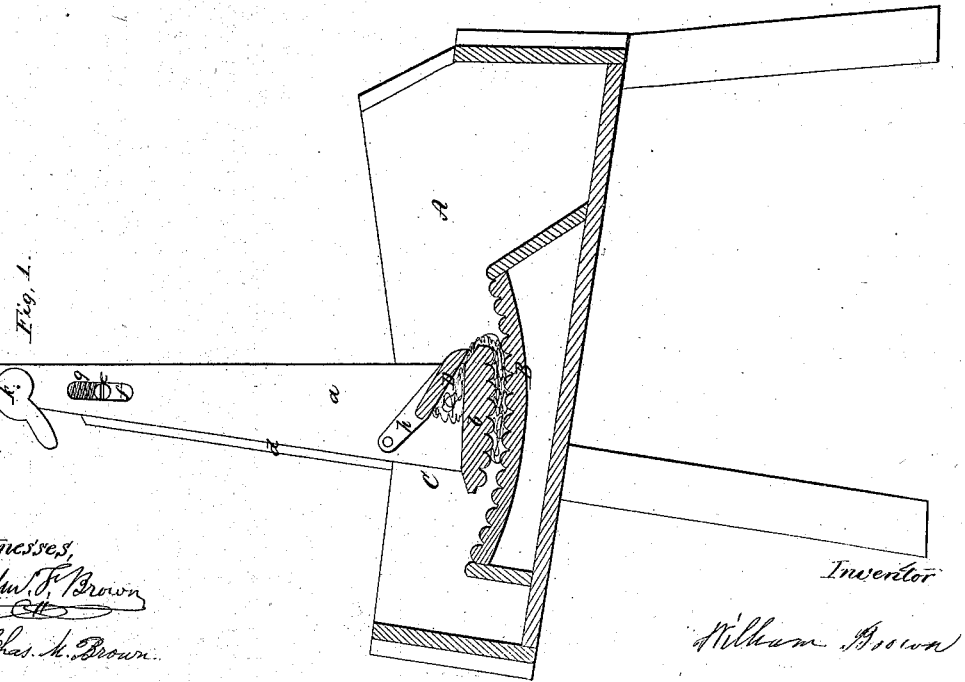

UNITED STATES PATENT OFFICE.

WILLIAM BROWN, OF PETERSBURG, PENNSYLVANIA.

IMPROVED WASHING-MACHINE.

Specification forming part of Letters Patent No. 35,296, dated May 20, 1862.

*To all whom it may concern:*

Be it known that I, WILLIAM BROWN, of the borough of Petersburg, in the county of Perry and State of Pennsylvania, have invented a new and useful Improvement in Washing-Machines; and I do hereby declare that the following is a full, clear, and exact description of the same, reference being had to the accompanying drawings, forming a part of this specification, in which—

Figure 1 is a vertical longitudinal section of a washing-machine constructed with my improvement. Fig. 2 is a transverse section of the same.

Similar letters of reference in each of the several figures indicate corresponding parts.

This invention consists in a bar so hinged to the uprights of the rubber that it will fall by its gravity on the rubbing-board of the rubber for the purpose of gripping the articles to be washed between it and said rubbing-board.

To enable others skilled in the art to make and use my invention, I will proceed to describe its construction and operation.

A represents the wash-box; B, a concave fluted wash-board concentric with the axis upon which the rubber vibrates.

C is the rubber. It consists of two uprights, $a\,a$, and a fluted rubbing-board, $b$, which is fastened to the lower extremities of the uprights $a\,a$. These uprights are connected to the standards $d\,d$ by means of pivots $e\,e$, which are fixed in the standards and extend through oblong vertical slots $f\,f$ of the uprights $a\,a$ of the rubber, said slots being furnished with springs $g\,g$, the upper extremities of which bear against the eccentrics $k\,k$ and the lower rest upon the pivots $e\,e$. By this ordinary method of suspending the uprights the rubber is caused to exert a gentle yielding pressure, and has vertical play up and down, and by turning the eccentrics back or forth the rubbing-board $b$ is caused to move farther from or nearer to the wash-board B, in order to accommodate the machine to more or less bulky articles.

D is a bar hinged to the uprights $a\,a$ by means of the hinges $h\,h$ in the manner shown. It is by thus hinging this bar that its gravity is rendered available for gripping the article to be washed between it and the rubbing-board $b$.

In operating with the above-described machine the wash-box A is filled with water as high as the wash-board B, and the portion of the article to be washed is gripped between the bar D and the rubbing-board $b$. The remaining portion is then washed between the rubbing-board and wash-board by placing the hands on the gripping-bar and vibrating the rubber over the wash-board. The article is then gripped by the washer portion and the remaining portion washed.

What I claim as my invention, and desire to secure by Letters Patent, is—

The gripping-bar D, hinged to the uprights $a\,a$, in the manner herein described and shown, for the purpose set forth.

The above specification of my improvement in washing-machines signed by me this 18th day of April, 1862.

WILLIAM BROWN.

Witnesses:
EDM. F. BROWN,
CHAS. M. BROWN.